Aug. 20, 1929.  J. A. HIRST  1,725,079
SWITCH GEAR FOR STARTING AND CONTROLLING ELECTRIC MOTORS
Filed Aug. 14, 1923  9 Sheets-Sheet 1

FIG.1.

INVENTOR:
JOHN A. HIRST

INVENTOR:
JOHN A. HIRST

Aug. 20, 1929.       J. A. HIRST       1,725,079
SWITCH GEAR FOR STARTING AND CONTROLLING ELECTRIC MOTORS
Filed Aug. 14, 1923    9 Sheets-Sheet 6

FIG. 17.

INVENTOR:
JOHN A. HIRST

Aug. 20, 1929.   J. A. HIRST   1,725,079
SWITCH GEAR FOR STARTING AND CONTROLLING ELECTRIC MOTORS
Filed Aug. 14, 1923   9 Sheets-Sheet 7

INVENTOR
JOHN A. HIRST
by Spear, Middleton, Donaldson Hare
Attys.

Aug. 20, 1929. J. A. HIRST 1,725,079
SWITCH GEAR FOR STARTING AND CONTROLLING ELECTRIC MOTORS
Filed Aug. 14, 1923 9 Sheets-Sheet 8

INVENTOR
JOHN A. HIRST

Aug. 20, 1929.   J. A. HIRST   1,725,079
SWITCH GEAR FOR STARTING AND CONTROLLING ELECTRIC MOTORS
Filed Aug. 14, 1923   9 Sheets-Sheet 9

INVENTOR:
JOHN A. HIRST

Patented Aug. 20, 1929.

1,725,079

UNITED STATES PATENT OFFICE.

JOHN A. HIRST, OF CHESTER, ENGLAND.

SWITCH GEAR FOR STARTING AND CONTROLLING ELECTRIC MOTORS.

Application filed August 14, 1923, Serial No. 657,360, and in Great Britain August 15, 1922.

This invention relates to switchgear for starting and controlling electric motors, and is particularly applicable to gear for starting three-phase motors.

According to the invention the switchgear comprises a circuit breaker, and a series of connection-changing switches preferably operated by a shaft to which a step-by-step rotary motion in the one direction is imparted by a handle, of the type described in the specification to United States Letters Patent No. 1,425,769, granted to the present applicant and another, to which handle, reciprocating angular motion, in the one plane can be imparted, which motion operates a ratchet so as to impart to the latter successive angular movements always in the same direction; the handle is also capable of secondary movement, in another plane, from an inoperative position to a position in which it is adapted to operate the ratchet, and vice-versa; the last mentioned movement of the operating handle does not actuate the ratchet and is employed to effect the opening of the circuit breaker should the handle be released before the complete cycle of operations is completed. The mechanisms by which the shaft operates the several connection-changing switches may be employed to close, hold closed and open these switches, but the mechanism by which the said shaft operates the circuit breaker only serves to close the latter which is held closed by a holding detent, which is released, when an overload device is actuated, or when a no-volt device is actuated, or when the operating handle is released before the complete cycle of operations is completed; preferably the said holding detent is mechanically tripped, being fitted with a trip lever normally tending to release it but prevented from doing so by one or other of two engaging pieces, one of which is actuated by the secondary movement of the handle and is operative only while the handle is held in its operative position, and the other of which is rotated with the operating shaft and is operative only when the shaft is in the position it occupies after the complete cycle of operations has been effected. In a modification instead of arranging for the secondary movement of the handle mechanically to trip the holding detent, this movement controls a switch in the circuit of the no-volt device which is opened when the handle is released, which switch is short-circuited by a switch closed only when the complete cycle of operations has been effected.

The invention also comprises improved constructions, connections and mode of operation of oil-break or air-break switches whereby a compact, accessible and efficiently protected switch gear is obtained, which is well adapted for complete enclosure in an ironclad casing.

The invention is illustrated in the accompanying drawings in which:—

Figs. 1 to 19 show the application to an oil-break switchgear, and

Figs. 20 to 24 show the application to air-break switchgear.

Figs. 1, 2, and 3 show the general arrangement, for a star-delta starter with oil-immersed circuit breaker and connection-changing switches.

Figs. 13 to 16 show modifications of the mechanism illustrated in Figs. 1 to 12.

Referring first to Figs. 1 to 12.

A is the main casing closed by a cover $a^1$, and having detachably fitted thereto an oil-container $a^2$ held in place by the bolts $a^3$.

Figure 17:
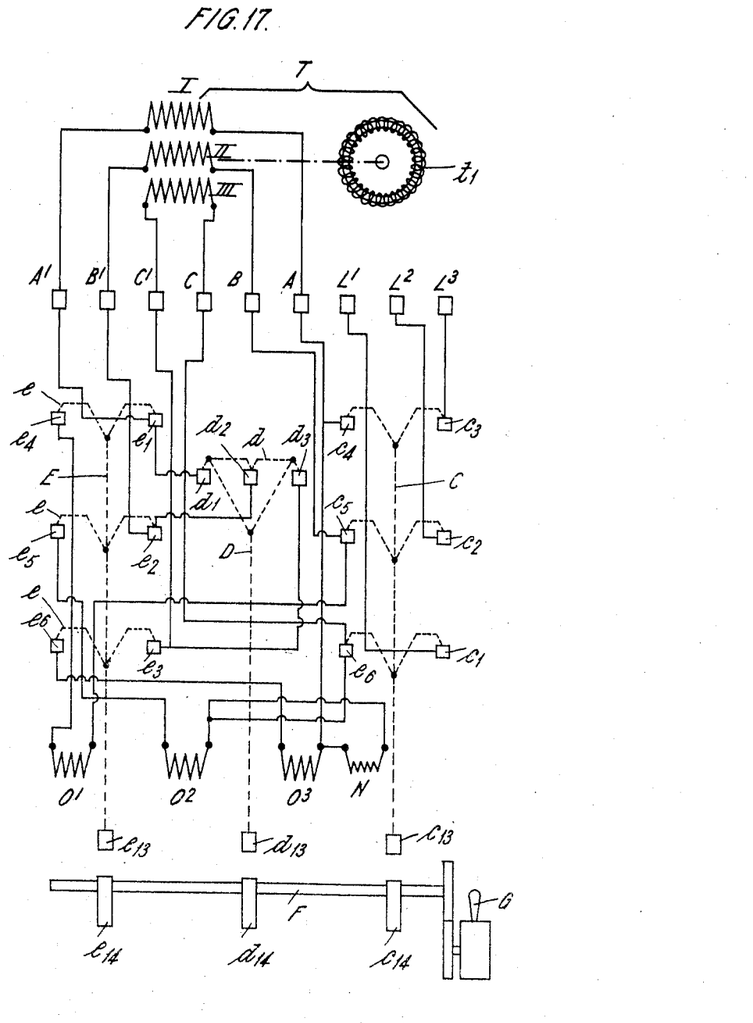
Fig. 17 is a diagram of the connections for star-delta connected stator windings for an electric motor.

C is the circuit breaker switch carrying three pairs of blades $c$, the blades of each pair being connected, and the several pairs insulated from each other, when closed this switch connects the three respective contacts $c^1$, $c^2$ and $c^3$, connected to the line wires $L^1$, $L^2$ and $L^3$, (see Fig. 17) to the contacts $c^6$, $c^5$ and $c^4$. The switch is operated by a pair of rods $c^7$ fitted with springs $c^8$ tending to force the switch to its lower open position, the rods $c^7$ are connected to a two-part connection piece $c^9$ which is pivoted to a lever $c^{10}$, having two side-arms, by the pin $c^{11}$. The lever $c^{10}$ is pivoted at one end on a shaft B carried in the bushes $b^1$ and is located axially on this shaft by the distance pieces $b^2$; the lever $c^{10}$ is fitted at its outer end with a detent pin $c^{12}$, and carries a roller $c^{13}$ which is actuated by a cam $c^{14}$ keyed to an operating shaft F which is geared by the spur wheels $f^1$ and $g^1$ to the handle mechanism G. As the shaft F is rotated the switch C is lifted by the cam $c^{14}$ to its closed position, in which it is held by the engagement of the pin $c^{12}$ with the holding detent J.

The wheel $g^1$ is fixed to a sleeve $g^2$ mounted in the fixed part $g^3$ of the casing of the handle mechanism G (see Fig. 4), to which sleeve is fixed a ratchet $g^4$ actuated by a pawl $g^5$ carried by the angularly reciprocating part $g^6$ of the handle casing to which latter the handle G is pivotally attached to the bow shaped lever $g^8$ keyed to a pin $g^7$ pivoted across the casing part $g^6$. When the handle is used to reciprocate the casing, a step-by-step angular movement is imparted to the shaft F.

D is a switch having three contacts $d$, when the switch is closed to connect together the three contacts $d^1$, $d^2$ and $d^3$, so as to make the star connections. E is a three-pair contact switch the contacts $e$ of which are adapted to connect the three contacts $e^1$, $e^2$ and $e^3$ respectively, to the contacts $e^4$, $e^5$ and $e^6$ to make the delta connections.

The switches D and E are connected by respective rods $d^7$ and $e^7$ (fitted with springs $d^8$ and $e^8$) to connection pieces $d^9$ and $e^9$, which in turn are connected to levers $d^{10}$ and $e^{10}$ by pins $d^{11}$ and $e^{11}$, and the cam levers $d^{10}$ and $e^{10}$ are pivoted on the shaft B and fitted with respective cam rollers $d^{13}$ and $e^{13}$ which are operated by respective cams $d^{14}$ and $e^{14}$ on the cam shaft F. These several parts are constructed and connected as described in connection with the circuit breaker switches C, except that the levers $d^{10}$ and $e^{10}$ have no detent pin and holding detent such as $c^{12}$ and J as provided for the lever $c^{10}$; the levers $d^{10}$ and $e^{10}$ are respectively held in the positions in which they close the switches D and E, by means of the cams $d^{14}$ and $e^{14}$ which are so shaped (see Figs. 10 and 11) that they close the switches at the appropriate period in the rotation of the shaft F and retain them closed for the respective times required.

The detent J is pivoted on the detent operating shaft K, one edge $j^1$ of a slot $j^2$ in its boss $j^3$ being caused by the spring $j^4$ (attached by one end to the said boss and at the other end to the lever P), to bear against the pin $k^1$ of the shaft K, thus permitting the detent to have limited spring controlled movement relatively to the shaft K. Thus when the detent J is in its engaging position it can yield and thus permit the pin $c^{12}$ of the circuit breaker lever $c^{10}$ (see Figs. 3 and 6) to pass the detent end and engage therewith.

The shaft K has keyed to it two levers M the free ends of which are connected by the rod $m^1$ which rests on the pips $o^1$ and $o^2$ of the overload magnets $O^1$ and $O^2$; the pip $o^3$ of the third overload magnet, $O^3$, has been interposed between it and the rod $m^1$ a roller $q^1$ carried on the end of a lever Q pivoted at $q^2$ and through which the stalk $n^1$ of the no-volt magnet N passes, the adjusting nut $n^2$ being well above the lever Q when the no-volt magnet N is energized.

When any one of the overload magnets is traversed by a current in excess of its setting its pip is forced upwardly, and raises the rod $m^1$ which tilts the lever M and turns the shaft K in a direction which causes the detent J to release the pin $c^{12}$ of the lever $c^{10}$ whereupon the circuit breaker switch C, previously held closed, is opened by its weight assisted by the springs $c^8$ on the rods $c^7$.

Should the no-volt magnet N become deenergized its plunger, and with it the attached stalk $n^1$ drops; the nut $n^2$ then engages with the end of the lever Q and tilts it about its pivot $q^2$, raising the roller $q^1$ and the rod $m^1$, thus titlting the levers M and turning the shaft K and detent J so that in this case also the pin $c^{12}$ is released and the circuit breaker switch C is opened.

The shaft K has also keyed to it a lever P, so disposed that its free end $p^1$ normally is under the end of the arm $r^1$ of a trip lever R, which takes the form of a bell crank lever having two arms $r^1$ and $r^2$; the lever R is pivoted at $r^3$ to the bracket $r^4$ and is controlled by a spring $r^5$ normally tending to depress the free end of the arm $r^1$ so that it depresses the end $p^1$ of the lever P so tilting the shaft K and causing the detent to release the pin $c^{12}$ of the circuit breaker switch lever $c^{10}$.

When the handle G is in its operative position (as shown in chain dotted lines Fig. 1) a cam $g^9$ fixed to the pin $g^7$ forces in opposition to a spring $g^{11}$ an engaging piece $g^{10}$ axially outwardly; the end of this piece then engages the arm $r^2$ of the trip lever R and holds its arm $r^1$ up and out of contact with the lever P. A second engaging piece $g^{12}$ fixed on and rotating with the wheel $g^1$ is also adapted, when the wheel $g^1$ is in the position corresponding with the full-on position of the gear, to engage the arm $r^2$ and hold the arm $r^1$ out of contact with the lever P.

The cam shaft F has keyed to it a ratchet wheel $f^2$ (see Figs. 2 and 12), and a double plate lever $f^3$ fulcrumed on the pivot shaft B carries a roller $f^4$ adapted to engage with the spaces of the ratchet wheel $f^2$, and is pressed into engagement therewith by the spring $f^5$ the lower end of which is anchored to the casing. As the shaft F is rotated by the handle mechanism the action on the ratchet $f^2$ of the roller $f^4$ carried by the spring-controlled lever $f^3$ is such as to ensure a definite angular step being given to the shaft F for each operation of the handle.

Figure 3:
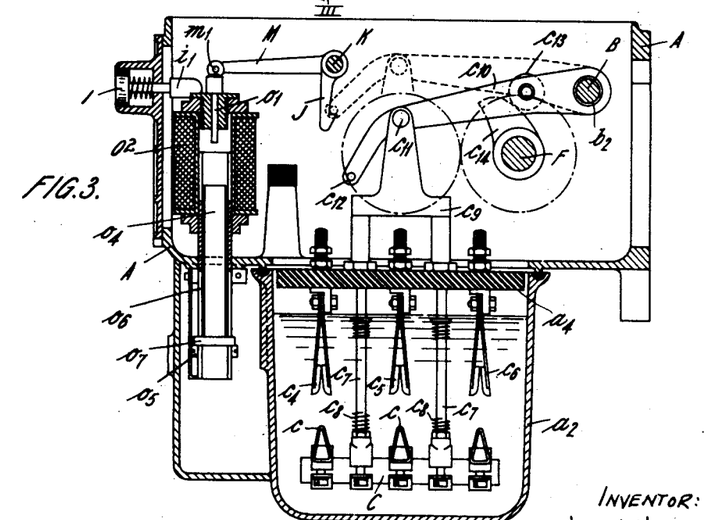
Fig. 3 is a side elevation in section on the line III, III of Fig. 2.
Figure 4:
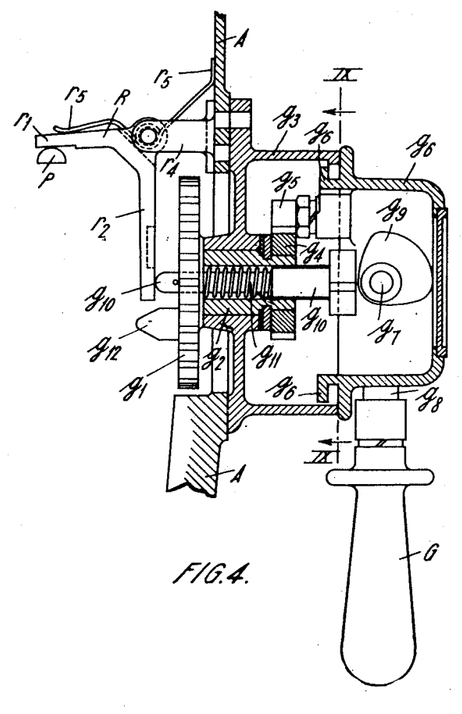
Figs. 4, 5 and 6 are detail views to a larger scale of the handle mechanism, the holding pawl, trip lever and engaging pieces.
Figures 5, 6, 9:
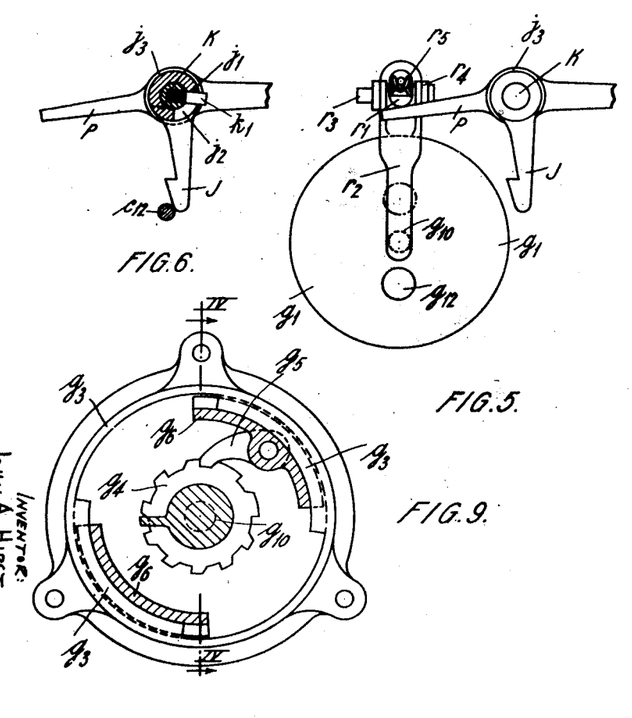
Fig. 9 is an end elevation in section on the line IX, IX, of Fig. 4.

The construction of the overload device is shown in Fig. 3. The electro-magnet $O^3$ is fitted with a plunger $o^4$, the axial position of which in the magnet coil may be adjusted by, say, a nut $o^5$ screwing on the threaded exterior of the slotted tube $o^6$, so that a pin $o^7$ attached to the plunger $o^4$ rests on the nut $o^5$; in this way the axial position of the plunger $o^4$ may be set so that it lifts at any desired overload. When the plunger $o^4$ is lifted it moves up with an accelerated velocity until it strikes the stalk of the pip $o^3$, the hammer head of the pip lifting the rod $m^1$ and releasing the detent.

Figures 7, 8, 10, 11, 12:
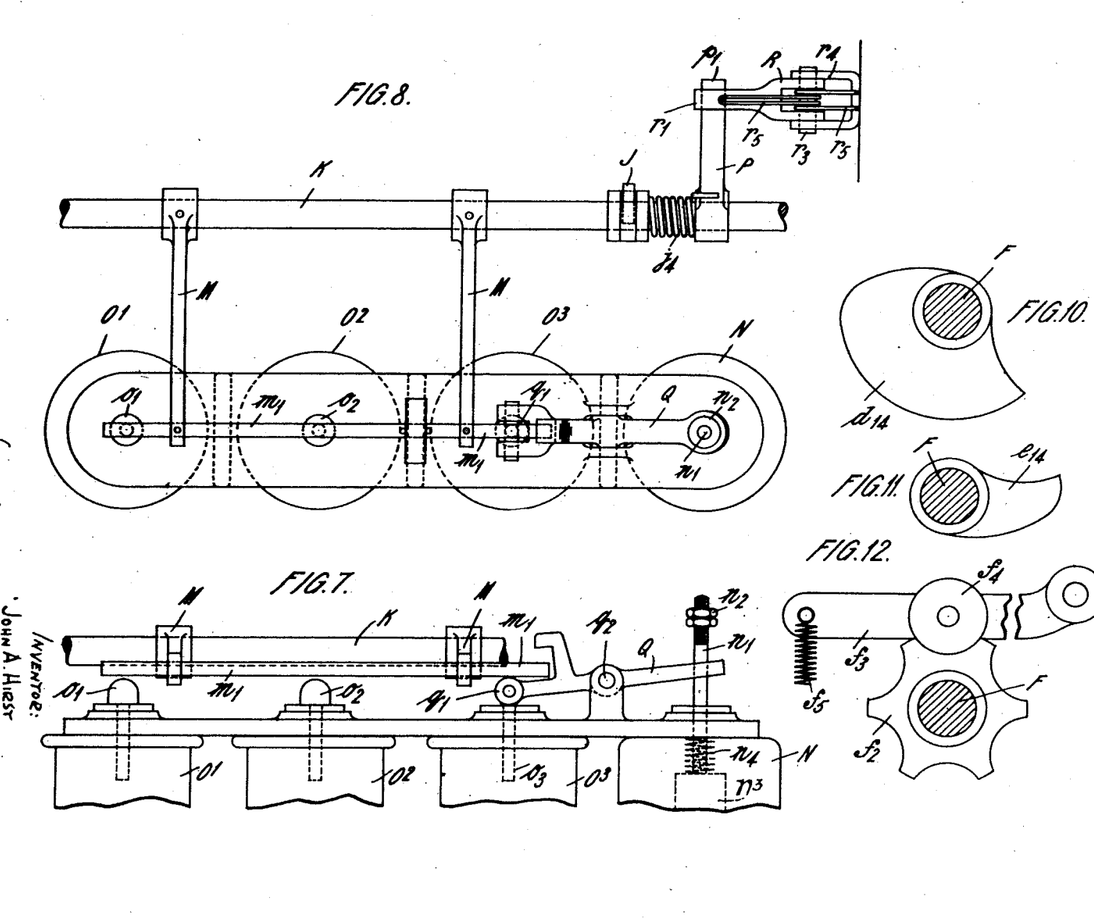
Fig. 7 is a fragmentary elevation, to a larger scale, on the line VII, VII of Fig. 2.
Fig. 8 is a corresponding enlarged scale fragmentary plan.
Figs. 10 and 11 are views of the switch actuating cams.
Fig. 12 is a view of the ratchet and roller to give definite successive angular locations to the gear.

In the no-volt coil the plunger $n^3$ (see Fig. 7) is so arranged that when the coil is energized the plunger is in its upper position, its stalk $n^1$ being in the position shown in Fig. 7. A spring $n^4$ may be fitted round the stalk so as to be interposed between the top of the plunger and inside of the cap, which spring normally tends to depress the plunger; when the no-volt coil is de-energized, the plunger is forced down by its own weight and by the spring $n^4$, whereupon the nut $n^2$ engages with the lever Q, tilting it and raising the bar $m^1$ and releasing the detent J as described.

The contacts $c^1 \ldots c^6$, $d^2 \ldots d^3$ and $e^2 \ldots e^5$ are carried from an insulating base $a^4$ which is bolted to suitable flanges $a^5$ formed at the bottom of the casing A, the base $a^4$ serving to separate the interior of the casing A from the oil container $a^2$. This base carries the terminals $c^{15}$, $d^{15}$ and $e^{15}$, to which the several connecting cables are coupled.

In the arrangement illustrated, for a star-delta starter, one set of circuit breaker switch contacts $c^1$, $c^2$, $c^3$ are connected (see Fig. 17) to the line wires $L^1$, $L^2$ and $L^3$, and the several contacts of the switch D and switch E are connected to the three phases I, II and III of the stator winding of the motor T of which $t^1$ is the rotor as shown; the overload windings $O^1$, $O^2$ and $O^3$ being connected, as shown, so as to be brought into the circuit after the closure of the switches D and E; or, of course, they may be arranged so as to be in circuit immediately the circuit breaker C is closed. The no-volt winding N is connected across any two of the phases.

A push button I is so arranged (see Fig. 3) that a wedge like portion $i^1$ thereof may, in opposition to a spring, be pushed under a roller $i^2$, and by raising it and moving the detent lever J cause the opening of the circuit breaker.

The action is as follows:—

Figure 1:
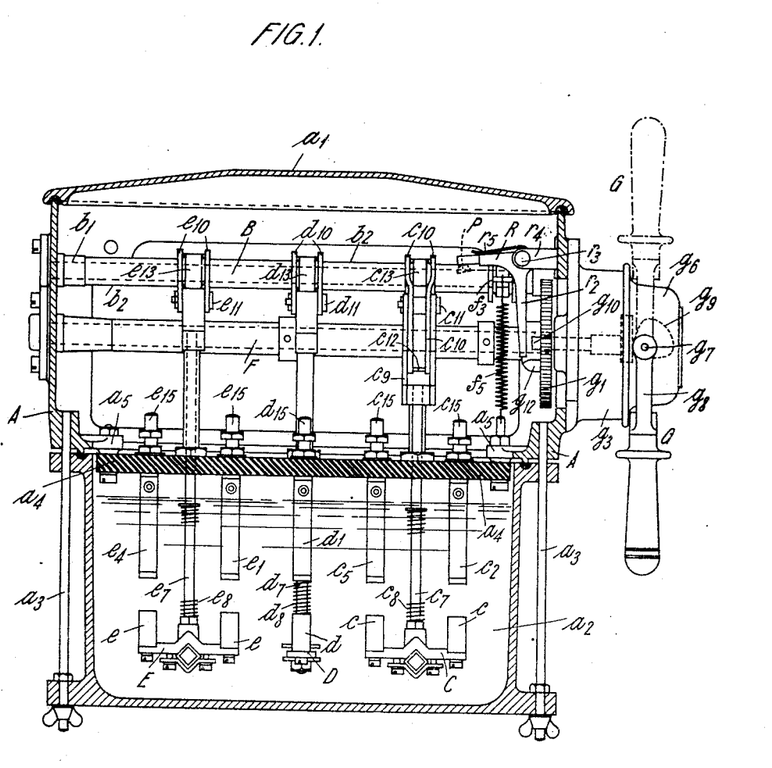
Fig. 1 is an elevation in section on the line I, I of Fig. 2.
Figure 2:
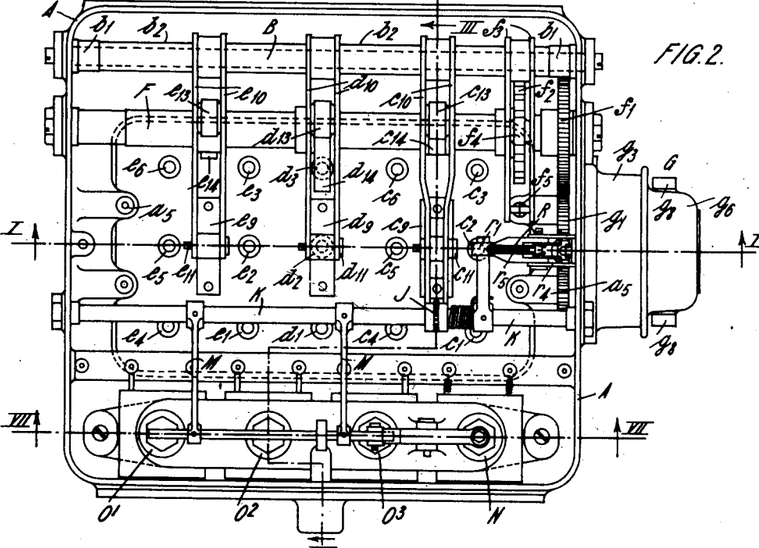
Fig. 2 is a plan with the cover removed.

Assuming the apparatus to be in the "off" position in which all the switches would be open and that the movement imparted to the shaft F for each operation of the handle is one sixth of a revolution; the handle G is grasped by the hand and turned into the operating position shown in chain dotted lines Fig. 1; the cam $g^9$ moves the engaging piece $g^{10}$ into contact with the arm $r^2$ of the lever R and so holds the arm $r^1$ of this lever out of contact with the lever P, thus leaving the detent free to engage with the pin $c^{12}$. The first forward stroke of the handle G moves the circuit breaker cam $c^{14}$ past the cam roller $c^{13}$ (see Fig. 3), thus raising the lever $c^{10}$ into the position shown in dotted lines, where the pin $c^{12}$ is held in engagement by the detent J. The circuit breaker is now closed, is free of its cam and is ready to be released to be opened by the overload or no-volt coil actuating the detent lever J. The second forward stroke of the handle causes the engagement of the cam $d^{14}$ with the cam roller $d^{13}$, so lifting the lever $d^{10}$, closing the switch D and making the star connection.

The third forward stroke of the handle maintains the switch D closed, the surface of the cam $d^{14}$ being shaped accordingly.

In like manner, during the fourth forward stroke of the handle, the switch D is maintained closed, thus giving ample time for the motor to accelerate its speed in the star position.

During the fifth forward stroke of the handle the cam $d^{14}$ passes from under the roller $d^{13}$ and the star switch D is opened, and the delta switch E is closed by the action of its cam $e^{14}$, roller $e^{13}$ and lever $e^{10}$, and the gear brought to the running position. In this position the retaining piece $g^{12}$ is brought into contact with the back of the arm $r^2$ of the lever R, thereby holding the arm $r^1$ clear of the lever P and so permitting the release of the handle without the trip lever R being actuated. Had the handle G been released prior to the running position being reached, and the retaining piece $g^{12}$ therefore not having reached its position behind the lever $r^2$, such release would have allowed the trip lever to actuate the lever P and so open the circuit breaker.

Should one of the overload magnets be subjected to an excess current, or the no-volt magnet be de-energized, the circuit breaker would be opened, in which case it would be necessary, before the connections could be re-established, to make the sixth forward stroke of the handle G which brings the gear back to its "off" position.

It will be seen that the rotation of the shaft F is always in the same direction, and that one further operation of the handle suffices to bring the gear from the full "on" position to the "off" position.

Figs. 13 to 16 illustrate a modification; in this arrangement, instead of the secondary movement of the handle being utilized to ensure, by mechanical means, the release of the detent J, should the handle be prematurely released, the movement of the engaging piece $g^{10}$ closes the contacts of a switch $g^{13}$ which is inserted in the no-volt coil energizing circuit. Movement of the handle G into its operative position prevents the switch $g^{13}$ from opening. Should the handle be released before the running position is reached, $g^{10}$ releases the switch $g^{13}$ which thereupon opens and breaks the no-volt circuit, and so trips the circuit breaker. When the gear reaches the running position, the contact $f^4$ on the shaft F is operated to close a switch $f^{5\prime}$ which short-circuits the switch $g^{13}$. The handle can therefore be released in the running position without tripping the circuit breaker.

Figures 13, 14, 15, 16:
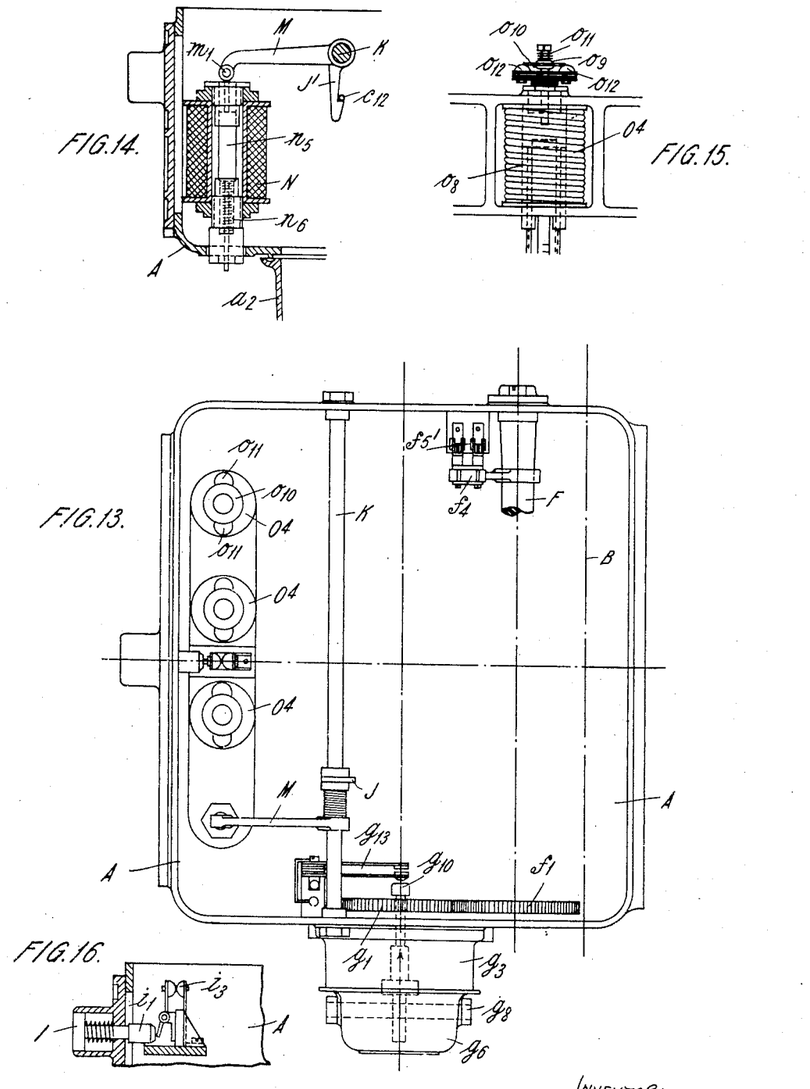
Fig. 13 being a part plan view.
Figs. 14, 15 and 16 being respectively a sectional elevation of a no-volt device, an elevation of an overload device, and a push button contact.

The no-volt coil used in this modification may be arranged as shown in Fig. 14. The plunger or armature $n^5$ of the no-volt magnet N is, under the influence of an adjustable spring $n^6$, pushed upwardly so as to trip the circuit breaker by moving the detent J' out of engagement with the pin $c^{12}$. When, however, the magnet N is energized the no-volt plunger is pulled into the position shown, which permits the engagement of the detent J' with the pin $c^{12}$. The detent J is mounted on a shaft K as described.

Each overload magnet consists of a magnet $O^4$ (see Fig. 15) the plunger $o^8$ of which, when the magnet is traversed by an excess current, strikes and lifts the pip $o^9$ against a spring $o^{11}$. The pip $o^9$ carries a switch disc $o^{10}$ normally adapted to make contact between the switch contacts $o^{12}$ which are inserted in the energizing circuit of the no-volt coil. Consequently, the operation of any of the overload coils lifts the corresponding disc $o^{10}$ deenergizes the no-volt coil and trips the circuit breaker.

A push button switch $i^3$ (see Fig. 16) actuated by a push button I is also inserted in the no-volt coil circuit so that the circuit breaker can be released by the pressure of the push button.

In Figs. 1 to 17, the arrangement is shown as suitable for a star-delta starter, but by suitably constructing and connecting the connection-changing switches D and E, the starter may be adapted for use with an auto-transformer starting arrangement, or for starting up a motor with a starting resistance in the rotor circuit.

In the modification heretofore described, oil break switches are employed, but the invention is equally applicable to air break switches. An arrangement suitable for a star delta starter with air break switches is illustrated in Figs. 18 to 24.

Figure 18:
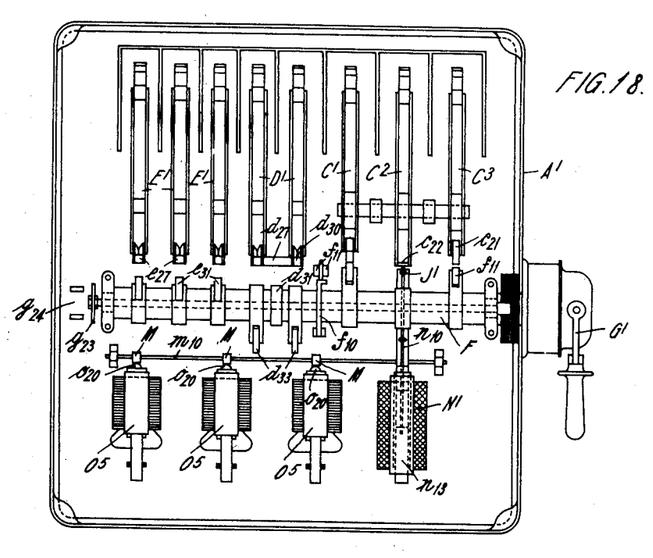
Fig. 18 is an elevation of the general arrangement of a starter with air-break switches.

In Fig. 18, $A^1$ is the enclosing casing, $C^1$, $C^2$ and $C^3$ the three switches of the circuit breaker; $D^1$ and $E^1$ the connection changing switches; F is the cam shaft and $G^1$ the handle mechanism; $O^5$ are the overload devices and $N^1$ the no-volt device.

Figure 19:
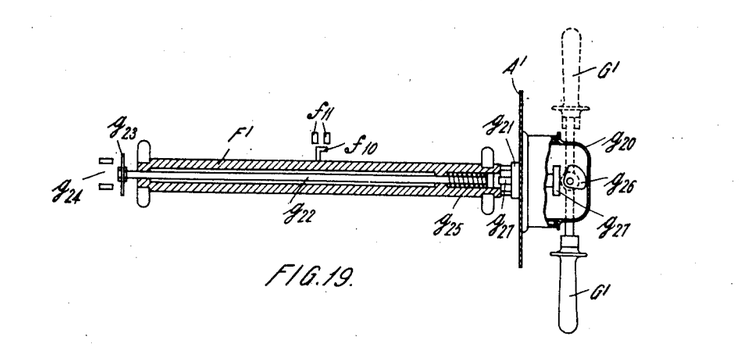
Fig. 19 a fragmentary section through the handle and operating shaft.
Figures 20, 22:
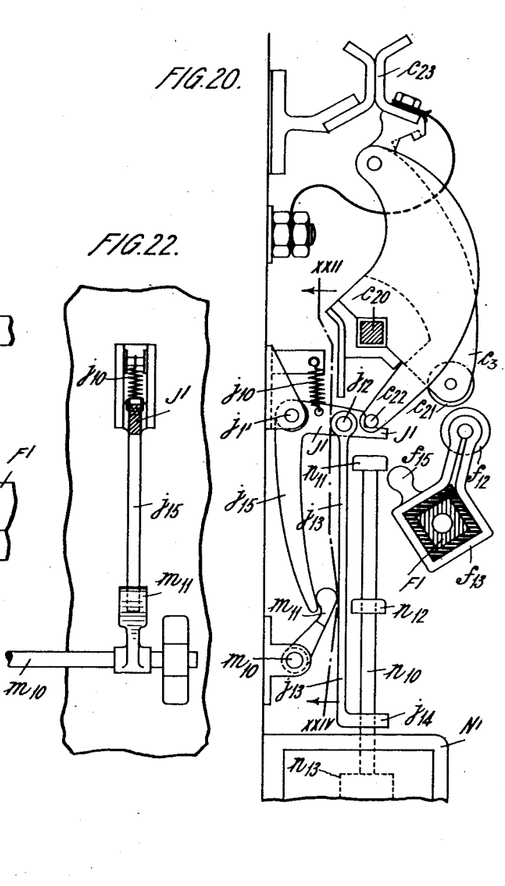
Fig. 20 is a side elevation, to a larger scale, of the circuit breaker, and its holding detent and release devices.
Fig. 22 is a corresponding part elevation in section on the line XXII, XXII of Fig. 20.
Figure 21:
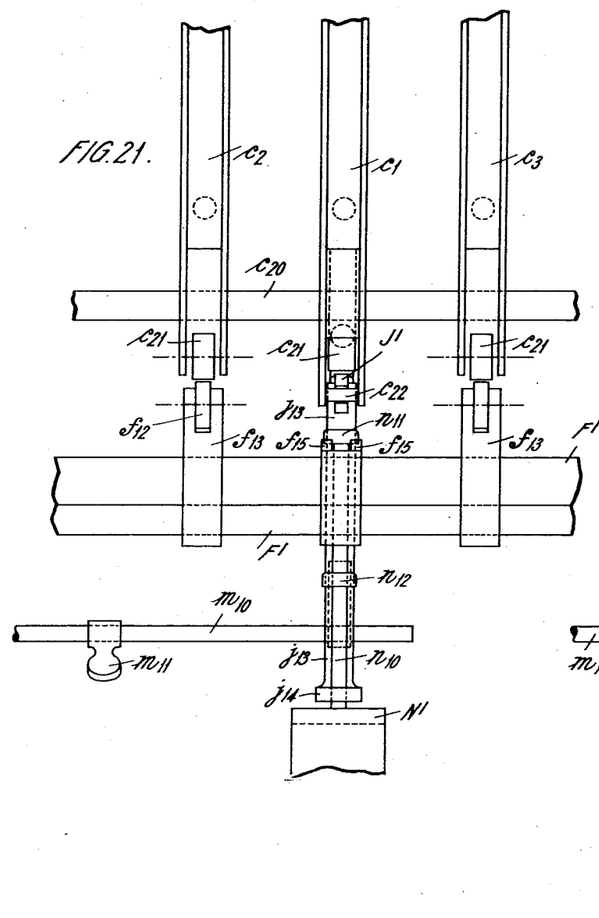
Fig. 21 is a corresponding part elevation.

As will be seen from Fig. 19, the handle $G^1$, when in the operative position shown in dotted lines, is adapted to reciprocate the casing $g^{20}$ which is fitted with a pawl engaging with a ratchet carried by the sleeve $g^{21}$, which is coupled by any convenient clutch member to the shaft $F^1$, so that the latter has a step-by-step angular movement imparted to it in known manner by the handle $G^1$. The spindle $g^{22}$, axially slidable in the shaft $F^1$, is adapted to have axial movement imparted to it in opposition to a spring $g^{25}$ so that the switch $g^{23}$ closes contacts $g^{24}$ in the energizing circuit of the no-volt coil.

Axial movement to close the switch $g^{23}$ is imparted to the spindle $g^{22}$ in known manner by the cam $g^{26}$ mounted on the spindle of the handle $G^1$, which cam engages with a sliding piece $g^{27}$ which makes abutting contact with the end of the spindle $g^{22}$. Mounted on the shaft $F^1$ is a switch $f^{10}$ which is adapted, when the shaft $F^1$ has been turned to the running position of the gear, to close the contacts $f^{11}$ of a switch $f^{10}$ also arranged in the no-volt coil energizing circuit; should the handle $G^1$ be released before the gear is turned into the said position, the no-volt coil circuit is broken and the no-volt device releases the detent of the circuit breaker as hereinafter described.

The circuit breaker (see Figs. 20 and 21) comprises three switches $c^1$, $c^2$ and $c^3$ connected together so as to move about the pivot shaft $c^{20}$. The switches $C^2$ and $C^3$ have rollers $c^{21}$ and the switch is closed when the rollers $f^{12}$ on levers $f^{13}$ mounted on the cam shaft $F^1$ engage the rollers $c^{21}$ and move them into the position shown in Figs. 20 and 21. The switch $C^1$ has a pin $c^{22}$ which, when the three connected switches are closed, engages with a detent $J^1$ held in its engaging position by a spring $j^{10}$; the detent $J^1$ is pivoted at $j^{11}$, and to it is pivoted by the pin $j^{12}$ a rod $j^{13}$ the lower right angled end $j^{14}$ of which fits over the stalk $n^{10}$ of the plunger $n^{13}$ of the no-volt coil $N^1$. The stalk $n^{10}$ carries two collars $n^{11}$ and $n^{12}$ and a jaw piece $f^{15}$ carried from the cam shaft $F^1$ embraces the stalk $n^{10}$ engaging with a collar $n^{11}$ as the cam shaft is moved to close the circuit breaker, and raising the stalk $n^{10}$ to the position shown, in which position it is retained by the attraction between the no-volt magnet $N^1$ and its plunger $n^{13}$.

Should the no-volt coil become de-energized, the plunger $n^{13}$ falls and with it the stalk $n^{10}$ and collar $n^{12}$, the latter engaging with the end $j^{14}$ on the rod $j^{13}$, and tilting the detent $J^1$ in opposition to its spring; this releases the pin $c^{22}$ of the circuit breaker levers and so allows the circuit breaker to open at the contacts $c^{23}$. The overload magnets $O^5$ have pips $o^{20}$ (see Fig. 23) which are raised by the plunger $o^{21}$ of the overload coil when it is lifted by an excess current. Each pip is in contact with a lever M the levers being keyed to a shaft $m^{10}$ carried in suitable bearings (see Figs. 18, 23 and 24).

In line with the centre switch of the circuit breaker a lever $m^{11}$ is keyed to the shaft $m^{10}$, which lever normally makes contact with a depending arm $j^{15}$ of the detent $J^1$.

When the shaft $m^{10}$ is actuated by the operation of any one of the overload coils, the lever $m^{11}$ moves the depending arm $j^{15}$ and causes the detent $J^1$ to release the circuit breaker pin $c^{22}$, whereupon the circuit breaker opens.

Figure 23:
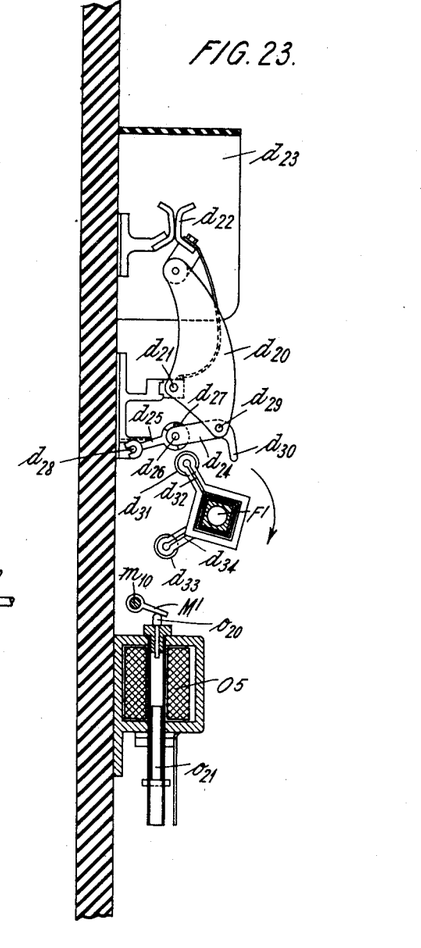
Figs. 23 and 24 are views similar to Figs. 20 and 21 but to a smaller scale and relate to a pair of connection-changing switches.
Figure 24:
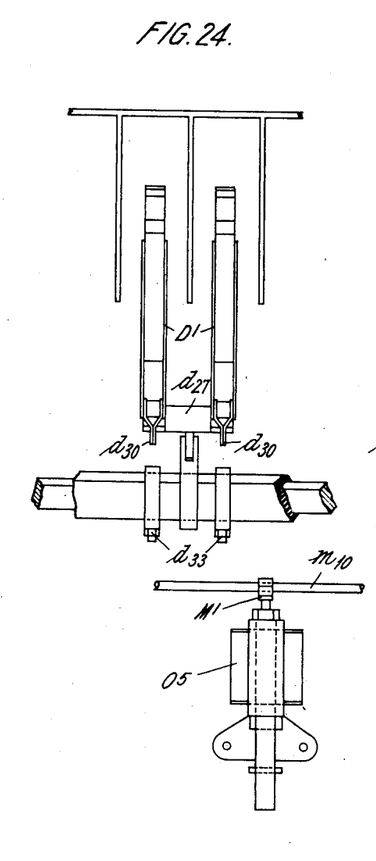

The construction of the switch $D^1$ is shown in Figs. 23 and 24; each switch consists of an arm $d^{20}$ pivoted at $d^{21}$ and carrying contacts $d^{22}$ adapted to make contact with fixed contacts. The switches are closed by a toggle consisting of two levers $d^{24}$ and $d^{25}$ pivoted together by a pin $d^{26}$ carrying a roller $d^{27}$. The other end of $d^{25}$ is pivoted at $d^{28}$ to a fixed point and the other end of $d^{24}$ is pivoted at $d^{29}$ to the lever $d^{20}$; $d^{24}$ is provided with a horn $d^{30}$.

The switch is closed by the engagement of a cam roller $d^{31}$ carried on an arm $d^{32}$ attached to the cam shaft $F^1$, and the switch D is positively opened by a roller $d^{33}$ carried from the cam shaft on an arm $d^{34}$.

The switches $D^1$ are preferably closed and opened together; two rollers $d^{33}$ and arms $d^{34}$ (see Fig. 24) being provided to effect the opening, the closing being effected by a single roller $d^{31}$. Each of the switches $E^1$ is constructed in similar manner to the switch $D^1$, but each has its own toggle roller $e^{27}$ and its own closing roller $e^{31}$ carried by an arm.

The switches $E^1$, like switches $D^1$ are closed and opened together, the switches being fitted with horns and the one roller serving to close the switch as it moves into the full "on" position of the gear and also to open the switch by its further movement to the "off" position.

In the claims herein I have used the term "overload device" to denote a device comprising an electro-magnet, the energizing coil of which is connected in the main circuit and the armature of which is moved in opposition to a controlling force into its actuating position when the current in the said coil exceeds a predetermined limit; and I have used the term "no-volt device" to denote a device comprising an electro magnet, the energizing coil of which is connected across the supply terminals and the armature of which is moved by its supply of controlling force into its actuating position when the said coil is de-energized.

Having now fully described my invention, I declare that what I claim and desire to secure by Letters Patent, is:—

1. In a motor starter; a circuit breaker, connection changing switches; means tending to open the circuit breaker; means tending to open the connection changing switches; closing means adapted to close the circuit breaker; closing means adapted to close and to hold closed the respective connection changing switches; a switch actuating shaft adapted, when successive angular movements are imparted to it, to operate the closing means of the circuit breaker and the connection changing switches in succession; shaft operating means for imparting successive angular movements to the switch actuating shaft; a no-volt device; holding means adapted to hold the circuit breaker closed; and movement transmitting means interposed between the said holding means and the respective actuated parts of the no-volt device and adapted when the said device is operated to release the said holding means.

2. In a motor starter; a circuit breaker, connection changing switches; means tending to open the circuit breaker; means tending to open the connection changing switches; closing means adapted to close the circuit breaker; closing means adapted to close and to hold closed the respective connection changing switches; a switch actuating shaft adapted, when successive angular movements are imparted to it, to operate the closing means of the circuit breaker and the connection changing switches in succession; shaft operating means for imparting successive angular movements to the switch actuating shaft; a no-volt device; an overload device; holding means adapted to hold the circuit breaker closed; and movement transmitting means interposed between the said holding means and the respective actuated parts of the no-volt device and the overload device and adapted when one of these devices is operated to release the said holding means.

3. In a motor starter; a circuit breaker, connecting changing switches; a spring tending to open the circuit breaker; springs tending to open the connection changing switches; closing means adapted to close the circuit breaker; closing means adapted to close and to hold closed the respective connection changing switches; a switch actuating shaft adapted, when successive angular movements are imparted to it, to operate the closing means of the circuit breaker and the connecting changing switches in succession; shaft operating means for imparting successive angular movements to the switch actuating shaft, comprising a handle having movement in one plane which is adapted to operate the shaft, and having a secondary movement in another plane by which it is brought from its in-operative to its operative position; holding means adapted to hold the circuit breaker closed; a lever actuated by a spring and when so actuated adapted to release the said holding means; means actuated by the handle when in its operative position and adapted when actuated to prevent the actuation of the lever; and means connected to the operating shaft and adapted when the latter is in the position corresponding with the full "on" position of the gear to prevent the actuation of the said lever.

4. In a motor starter; a circuit breaker, connecting changing switches; a spring tending to open the circuit breaker; springs tending to open the connection changing switches; closing means adapted to close the circuit breaker; closing means adapted to close and to hold closed the respective connection changing switches; a switch actuating shaft adapted, when successive angular movements are imparted to it, to operate the closing means of the circuit breaker and the connecting changing switches in succession; shaft operating means for imparting successive angular movements to the switch actuating shaft, comprising a handle having movement in one plane which is adapted to operate the shaft, and having a secondary movement in another plane by which it is brought from its inoperative to its operative position; holding means adapted to hold the circuit breaker closed; a lever actuated by a spring and when so actuated adapted to release the said holding means; means actuated by the handle when in its operative position and adapted when actuated to prevent the actuation of the lever; means connected to the operating shaft and adapted when the latter is in the position corresponding with the full "on" position of the gear to prevent the actuation of the said lever; a no-volt device; an overload device; and movement transmitting means interposed between the said holding means and the respective actuated parts of the no-volt device and the overload device, and adapted when one of these devices is operated to release the said holding means.

5. In apparatus as claimed in claim 4, holding means adapted to hold the circuit breaker closed and comprising a detent mounted on a shaft, a lever mounted on the said shaft carrying a bar which extends over the actuated parts of a plurality of overload devices; a trip lever one end of which is connected to the said bar and the other end of which is adapted to be actuated by the actuated part of the no-volt device, and is adapted when so actuated to release the circuit breaker holding detent.

6. In apparatus as claimed in claim 3, means for operating the switch actuating shaft comprising a ratchet adapted to drive the said shaft; a handle casing rotatable concentrically relatively to the said ratchet, a pawl carried by the said handle casing, a handle pivotally attached to the said casing by a spindle, the axis of which is at right angles to the axis of the ratchet; a cam mounted on the said spindle; an axially movable part operated by the said cam when the handle is moved to its operative position and which is adapted to hold the trip lever in its non-tripping position; and an engaging part rotated by the ratchet and adapted when the latter is moved to a position corresponding with the full "on" position of the gear to hold the tripping lever in its non-tripping position.

7. In apparatus as claimed in claim 1, a circuit breaker comprising oil immersed fixed contacts, movable contacts adapted when operated to contact with the fixed contacts, a spring adapted to oppose the actuation of the movable contacts, a lever pivoted at one end and connected at the other end to the movable contacts, a pin on the lever adapted to engage the holding means, a cam roller on the lever and having a cam mounted on the switch actuating shaft adapted by contact with the said roller to close the circuit breaker.

8. In apparatus as claimed in claim 1, connection-changing switches, each comprising oil immersed fixed contacts, movable contacts adapted when actuated to contact with the fixed contacts, a spring tending to prevent the actuation of the movable contacts, a lever pivoted at one end and connected at the other end to the movable contact, a cam roller mounted on the said lever; and a cam mounted on the switch actuating shaft and adapted to close and hold closed the connection-changing switches.

In witness whereof I set my hand.

JOHN A. HIRST.